United States Patent [19]

Hatano et al.

[11] Patent Number: 5,071,230
[45] Date of Patent: Dec. 10, 1991

[54] LIQUID CRYSTAL DISPLAY DEVICE WITH SELECTIVE TRANSMITTING MEANS AND AN IMPEDANCE CHANGING LAYER

[75] Inventors: Akitsugu Hatano, Tenri; Yutaka Ishii, Nara, both of Japan

[73] Assignee: Sharp Kabushiki Kaisha, Osaka, Japan

[21] Appl. No.: 443,444

[22] Filed: Nov. 30, 1989

[30] Foreign Application Priority Data

Nov. 30, 1988 [JP] Japan .................................. 63-304958

[51] Int. Cl.$^5$ ............................................. G02F 1/133
[52] U.S. Cl. ......................................... 359/53; 359/72
[58] Field of Search ..................... 350/342, 335, 331 R

[56] References Cited

U.S. PATENT DOCUMENTS 4,110,014  8/1978  Yevick ............................ 350/347 R
4,622,654  11/1986  Yaniv et al. ........................ 350/342
4,908,584  3/1990  Reichman ............................ 350/342

OTHER PUBLICATIONS

Joseph et al, "Response Time of a Liquid Crystal Image Transducer", *Applied Optics* vol. 17, No. 13, 1978, pp. 1987–1989.
Bleha et al, "Application of the Liquid Crystal Light Valve to Real-Time Optical Data Processing", *Optical Engineering*, vol. 17, No. 4, 1978, pp. 371–384.
Reif et al, "Hybrid Liquid Crystal Light Valve-Image Tube Devices for Optical Data Processing", *SPIE*, vol. 83 Optical Information Processing (1976), pp. 34–43.

*Primary Examiner*—Stanley D. Miller
*Assistant Examiner*—Anita Pellman Gross

[57] ABSTRACT

Several large-screen displays making use of liquid crystal light valve have been realized. The photoactivated liquid crystal light valve is composed by intervening a photoconductor layer between a liquid crystal layer and an electrode. The photoconductor layer changes in impedance when exposed with light. Therefore, when light is emitted to the photoconductor layer while a voltage is applied between electrodes, the voltage applied to the exposed portion varies, and the orientation state of the liquid crystal layer changes. Thus, an image is formed on the liquid crystal layer. The structure for emitting/interrupting the light mentioned above may be reduced in size by using liquid crystal shutter arrays. As the liquid crystal layer usable in the liquid crystal shutter arrays, SmC* phase liquid crystal showing a ferrodielectric property may be used, so that the response may be enhanced. Therefore, not limited to the still picture display alone, a moving picture may be also displayed. Still further, since the liquid crystal shutter arrays are statically driven, the control is easy, and the number of electrodes may be increased. Thus, an image of high resolution may be displayed on the liquid crystal display valve.

7 Claims, 5 Drawing Sheets

LIQUID CRYSTAL DISPLAY DEVICE WITH SELECTIVE TRANSMITTING MEANS AND AN IMPEDANCE CHANGING LAYER

BACKGROUND OF THE INVENTION

1. Field of the Invention

The present invention relates to a liquid crystal display device, and more particularly to a liquid crystal display device for displaying, by projecting an image held by an image holding means, on a screen.

2. Description of the Prior Art

FIG. 1 is a diagram showing an optical composition of a first prior art liquid crystal display using a liquid crystal light valve 5 possessing a photoconductor layer. When displaying an image on the liquid crystal display device, the image displayed on a cathode ray tube (CRT) 51 enters into the liquid crystal light valve 5 by way of a lens 52.

FIG. 7 is a sectional view showing the composition of a liquid crystal light valve 5. In the composition of the liquid crystal light valve 5, transparent electrodes 22a, 22b, composed of a transparent conductive film of indium tin oxide (ITO), are formed on glass substrates 21a, 21b, and a hydrogenated amorphous silicon (a-Si:H) is formed on the transparent electrode 22b as photoconductor layer 25. The hydrogenated amorphous silicon is made of silane gas and hydrogen gas, and is fabricated by employing the plasma CVD method. On its surface, a multilayer film of silicon/silicon oxide is formed by a sputtering method, as a dielectric mirror 24.

After forming polyimide films, by spin coating, as orientation films 23a, 23b, the molecular orientation is processed by rubbing, and the glass substrates 21a, 21b are glued together by way of a spacer 27. By injecting and sealing a mixed nematic liquid crystal containing chiral material as the liquid crystal layer 26, the liquid crystal light valve 5 is thus composed. As the operation mode of the liquid crystal light valve 5, the hybrid field effect is employed.

Between the transparent electrodes 22a, 22b of the liquid crystal light valve 5 composed in such a structure, a voltage is applied from an AC power source 28. When the image from the CRT 51 enters from the glass substrate 21b side as mentioned above, the impedance of the photoconductor layer 25 varies depending on the quantity of incident light. As a result, the voltage to be applied to the liquid crystal layer 26 changes, and the orientation state of the liquid crystal is modified. Thus, an image corresponding to the image from the CRT 51 forms on the liquid crystal layer 26.

When light from a light source 54 enters the liquid crystal light valve 5 in which the image is thus formed, by way of a lens 55 and a polarization beam splitter 56, this incident light is reflected by the dielectric mirror 24. Further, the portion of this light reflected after passing through the orientation changed part of the liquid crystal layer 26 changes in polarization direction by the electro-optical effect. Thus it passes through the polarization beam splitter 56. This reflected light is magnified by a lens 57, so that the image formed on the liquid crystal light valve 5 is thereafter projected on the screen 58.

FIG. 2 is a diagram showing an optical structure of a liquid crystal display device of a second prior art device. This second prior art device is similar to the first prior art device, and the corresponding parts are identified with the same reference numbers. In the second prior art device, an image is formed on the liquid crystal light valve 5 by means of a laser beam 59.

In the first prior art device, since the resolution of the image displayed by the liquid crystal display device is determined by the resolution of the CRT 51, it is difficult to enhance the resolution. Further, since it is necessary to incorporate the CRT 51 into the liquid crystal display device, it is difficult to reduce the liquid crystal display device in size.

In the second prior art device although the resolution may be improved by reducing the irradiation area of the laser beam, additional space for accommodating the laser beam control mechanism is necessary, and hence it is difficult to reduce the liquid crystal display device in size.

SUMMARY OF THE INVENTION

It is hence a primary object of the invention to present a liquid crystal display device reduced structurally in size and capable of displaying images at a high resolution.

In order to achieve the above object, the invention presents a liquid crystal display device comprising:

an image holding means composed by forming an impedance change layer varying in impedance depending on the quantity of incident light, and a light reflection layer for reflecting light at least from the opposite side of the impedance change layer, on one of a pair of light penetrating substrates on which electrodes are formed almost on the entire surface, and intervening a liquid crystal layer between the substrates, a selective transmitting means for transmitting/interrupting the light by driving partially the contained liquid crystal layer, and being disposed at the same one of the substrates of the image holding means, and a light source being disposed on the opposite side of the selective transmitting means with respect to the image holding means.

The invention also presents a liquid crystal display device wherein the selective transmitting means comprises:

a plurality of liquid crystal elements composed by forming plural band-shaped transparent electrodes on the mutually confronting surface of the pair of light penetrating substrates, parallel at specified individually corresponding positions, and intervening liquid crystals between the substrates, and the individual liquid crystal elements are disposed so that the transparent electrodes may cross orthogonally each other.

The invention further presents a liquid crystal display device wherein the image holding means holds the image as optical change of the liquid crystal layer, by being applied light corresponding to the image to be displayed from the selective transmitting means, in a state of voltage being applied between the electrodes.

The invention moreover presents a liquid crystal display device which further comprises:

a light source for reading, a screen on which the image held by the image holding means is projected, and optical means for emitting light corresponding to the image to be displayed from the selective transmitting means, emitting light from the light source for reading to the image holding means which holds the image as optical change of the liquid crystal layer, and transmitting the reflected light corresponding to the image held by the image holding means toward the screen.

The invention furthermore presents a liquid crystal display device wherein the optical means comprise:

polarization optical means for reflecting a specified polarized wave out of incident light, while transmitting other polarized waves, being disposed on the optical path between the image holding means and screen.

According to the invention, the light from the light source enters into the image holding means by way of the selective transmitting means. The selective transmitting means transmits or interrupts the light from the light source to the image holding means. When the light enters the image holding means, the impedance of the impedance change layer varies depending on the quantity of incident light. Therefore, when a voltage is applied between the electrodes of the image holding means, the voltage applied to the liquid crystal layer intervening between the substrates varies. Thus, the orientation state of the liquid crystal changes. Therefore, when the light enters only the portion corresponding to the image to be displayed, the image may be held in the image holding means.

When light enters the image holding means, thus holding the image, from the opposite side to the light source, it is reflected by the light reflection layer. Of this reflected light, the portion passing through the orientation change part changes in polarization direction by the electro-optical effect of the liquid crystal. Therefore, when this reflected light is emitted, for example, to a light reflection screen, thus, the image held in the image holding means may be displayed on the light reflecting screen.

Further, by reducing the drive portion of the liquid crystal layer contained in the selective transmitting means, an image of high resolution may be held in the image holding means.

Thus, according to the invention, the resolution of the image held by the image holding means may be enhanced. Further, by composing the selective transmitting means by using liquid crystals, the liquid crystal display device may be reduced in size.

Furthermore, in the invention, the selective transmitting means contains plural liquid crystal elements. The liquid crystal elements are composed by forming plural band-shaped transparent electrodes on the mutually confronting surfaces of a pair of light penetrating substrates, at intervals in the corresponding positions, and intervening liquid crystals between the substrates. Each liquid crystal element is disposed so that the transparent electrodes may cross orthogonally to each other. Therefore, when two liquid crystal elements are used, for example, a voltage is applied to a set of electrodes of one of the liquid crystal elements to pass the light from the light source, and a voltage is further applied between necessary electrodes of the other liquid cystal element, so that the light corresponding to the image to be displayed may be given to the image holding means.

Still further, in the invention, the image holding means is provided with light corresponding to the image to be displayed from the selective transmitting means, in a state of a voltage being applied between electrodes. By this light, the impedance of the impedance change layer varies, and the voltage applied to the liquid crystal layer changes. Therefore, the image is held in the image holding means as an optical change of the liquid crystal layer.

According to the invention, moreover, the light from the light source for reading enters into the image holding means by way of the optical means, and is reflected by the light reflection layer. In the image holding means, an image is held as an optical change of the liquid crystal layer, and the reflected light corresponding to this image is transmitted toward the screen by means of the optical means. As a result, the image held in the image holding means is projected on the screen.

The invention also comprises a polarization optical means which reflects a predetermined polarized wave output of the incident light and transmits the other polarized waves, which are disposed on an optical path between the image holding means and screen. Therefore, of the light from the light source for reading, only the predetermined polarized wave enters the image holding means. The polarized wave passing through the liquid crystal layer in which the image is held, out of the polarized waves, changes in polarization state, and passes through the polarization optical means. As a result, the image held in the image holding means is projected on the screen.

BRIEF DESCRIPTION OF THE DRAWINGS

These and other objects of the invention, as well as the features and advantages thereof, will be better understood and appreciated in the following detailed description taken in conjunction with the drawings, in which.

DETAILED DESCRIPTION OF THE PREFERRED EMBODIMENT

Figure 1:
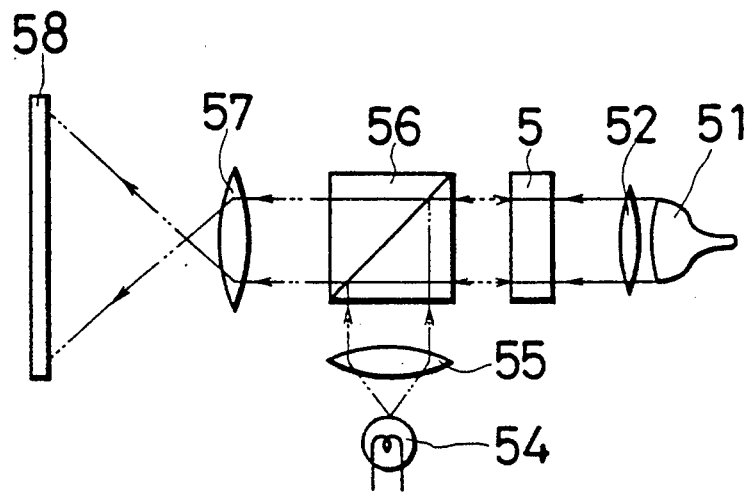
FIG. 1 is a block diagram illustrating the first prior art device.
Figure 2:
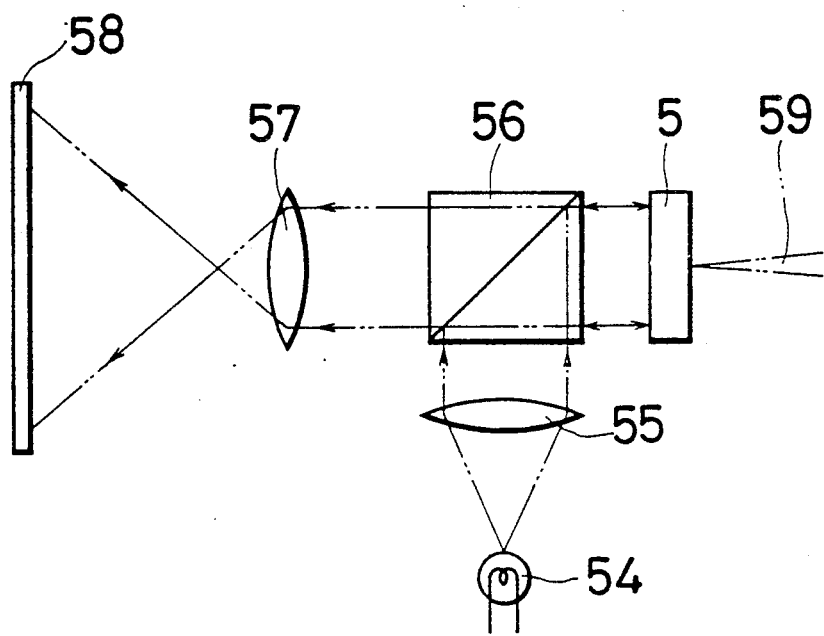
FIG. 2 is a block diagram illustrating the second prior art device.

Referring now to the drawings, one of the preferred embodiments of the invention is described in detail below.

Figure 3:
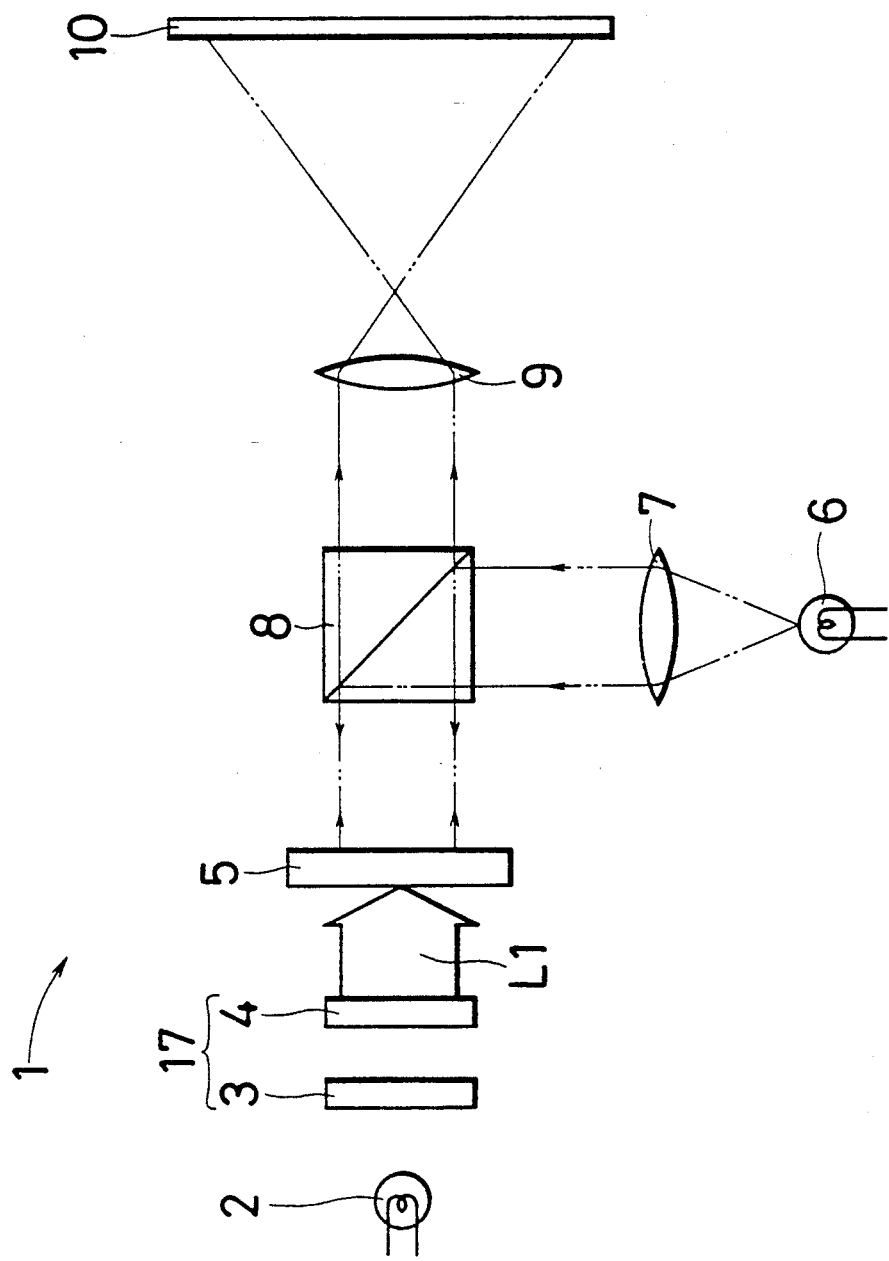
FIG. 3 is a diagram illustrating an optical structure of a liquid crystal display device 1.

FIG. 3 is a diagram showing an optical composition of a liquid crystal display device 1 as one of the embodiments of the invention. The light from a light source 2 is selectively passed or interrupted by selective transmitting means 17, and a writing light L1 corresponding to the image to be displayed is formed. The selective transmitting means 17 is composed of liquid crystal shutter arrays 3, 4 which are liquid crystal elements. The writing light L1 is applied to a liquid crystal light valve 5 which is an image holding means, and the corresponding image is displayed in the liquid crystal light valve 5.

When projecting the image displayed in the liquid crystal light valve 5 on a screen 10, the light from a light source for reading 6 is focused by a lens 7, and is linearly polarized by a polarization beam splitter 8 which is a polarization optical means. It then enters into the liquid crystal light valve 5. In the liquid crystal light valve 5, a light reflection layer is formed as will be described later, and the light entering the liquid crystal light valve 5 is reflected by the light reflection layer and enters again into the polarization beam splitter 8. Of the light reflected by the light reflection layer, the portion passing through the liquid crystal layer part where the image is displayed, that is, the orientation changed part of the liquid crystal changes in polarization direction by the electro-optical effect of the liquid crystal, so that it can pass through the polarization beam splitter 8. The transmitted light is magnified by a lens 9, and is emitted to the screen 10. As a result, the image displayed in the liquid crystal light valve 5 is projected onto the screen 10.

Figure 4:
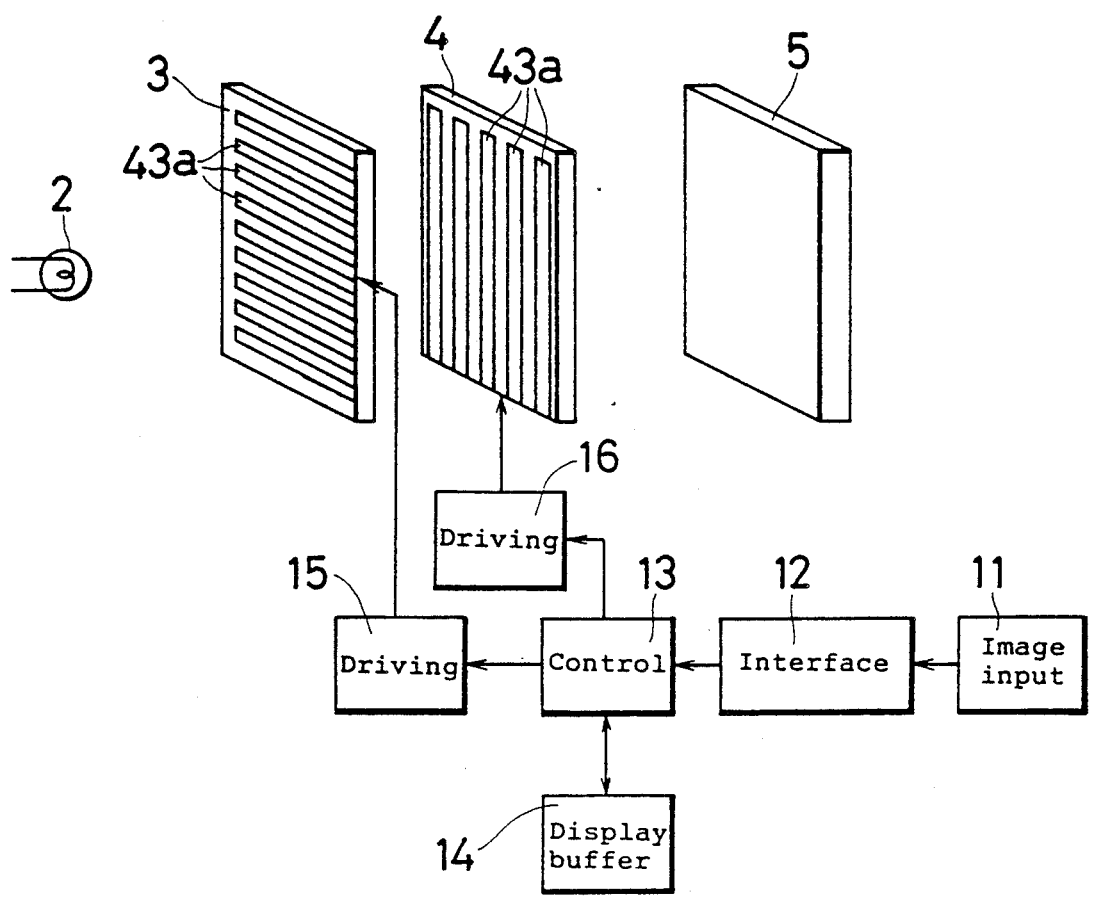
FIG. 4 is a block diagram illustrating an electrical structure of the liquid crystal display device 1.
Figure 5:
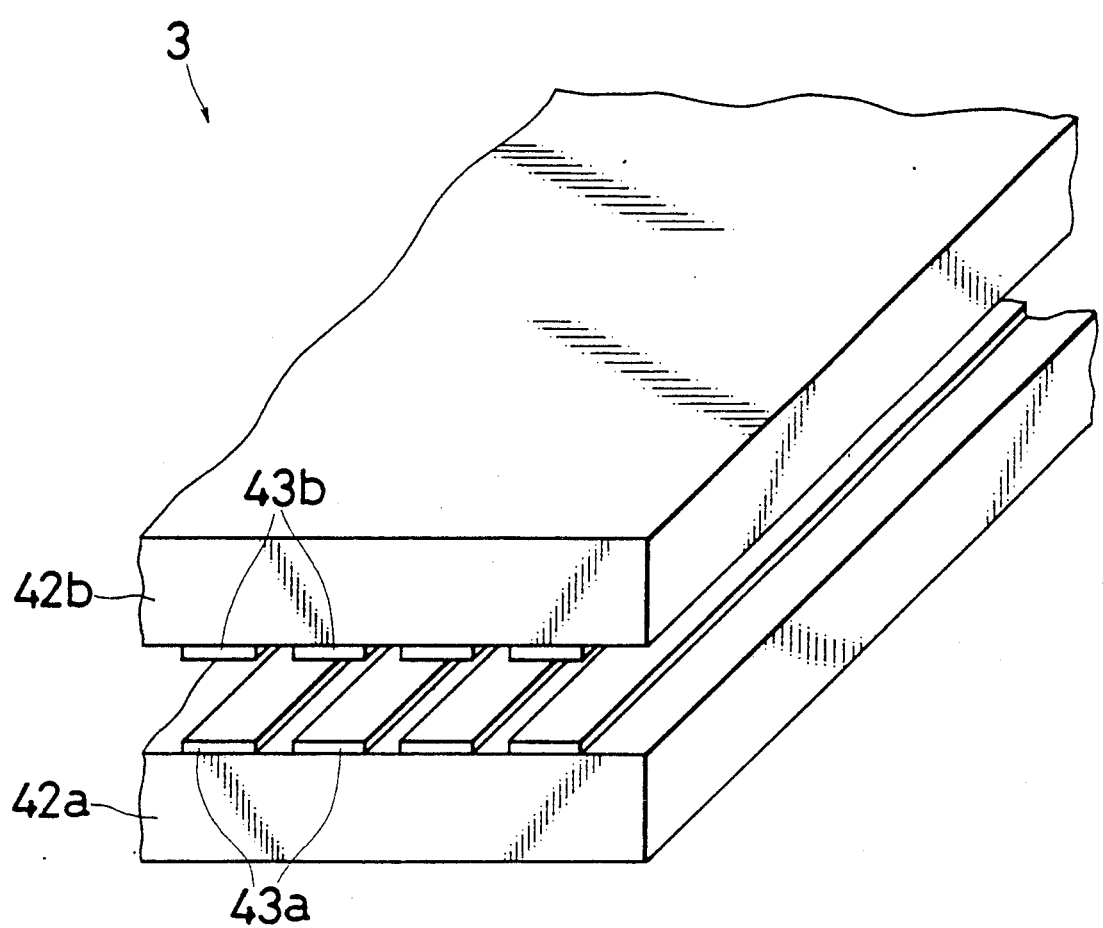
FIG. 5 is a perspective view of a liquid crystal shutter array 3.

FIG. 4 is a block diagram illustrating the driving method of the liquid crystal shutter arrays 3, 4, and FIG. 5 is a magnified oblique view showing part of the structure of the liquid crystal shutter array 3. In the liquid crystal shutter array 3, a plurality of band-shaped transparent electrodes 43a, 43b are formed on the mutually confronting surfaces of a pair of transparent electrodes 42a,42b, parallel at mutual intervals in the respectively corresponding positions. The liquid crystal shutter array 4 is similarly composed, and these liquid crystal shutter arrays 3 and 4 are disposed so that the band-shaped electrodes may cross each other orthogonally.

The image information from image input means 11 is given to a control unit 13 by way of an interface circuit 12. The control unit 13 stores the image information in a display buffer 14, and, according to this image information, drives the liquid crystal shutter arrays 3, 4 statically by way of driving circuits 15, 16. For example, a voltage is applied between a set of electrodes 43a, 43b of the liquid crystal shutter array 3 to transmit the light from the light source 2, and a voltage is applied between the electrodes 43a and 43b of the liquid crystal shutter array 4, as many as necessary, so that the light necessary for displaying the image information may enter the liquid crystal light valve 5. By repeating such action, the light corresponding to the image information may enter into the liquid crystal light valve 5 in line sequence.

Figure 6:
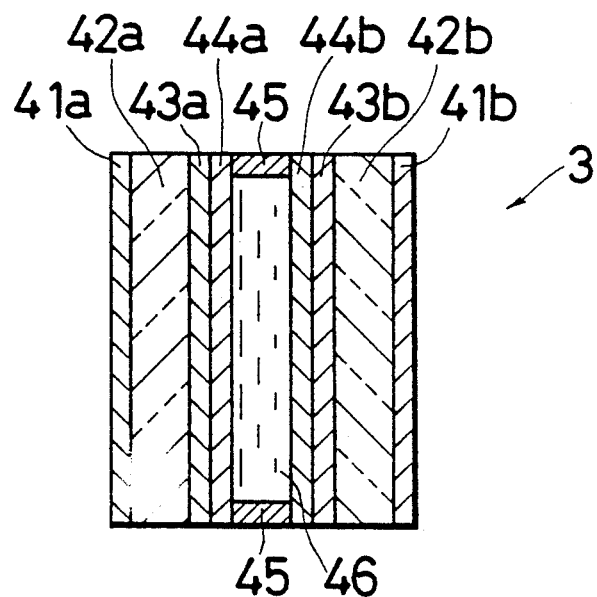
FIG. 6 is a sectional view of the liquid crystal shutter array 3.

FIG. 6 is a sectional view of the liquid crystal shutter array 3. On the mutually confronting surfaces of the transparent substrates 42a, 42b made of glass, acryl or the like, electrodes 43a, 43b, composed of transparent conductive films of indium tin oxide (ITO), are formed in a band shape, and orientation films 44a, 44b are formed thereon.

As the orientation films 44a, 44b, inorganic films such as silicon oxide (SiO) and silicon dioxide ($SiO_2$), or polyimide, polyvinyl alcohol, acryl and other organic films may be used. The orientation films 44a, 44b are treated with molecular orientation by rubbing. Such transparent substrates 42a, 42b are glued together with a spacer 45 at a spacing of 2 microns.

Between the substrates a liquid crystal layer 46 is injected and sealed, which is a liquid crystal showing SmC* phase (C-layer of smectic liquid crystal containing chiral material) as represented by CS-1014 of Chisso Corporation. Afterwards, the liquid crystal in the cell is once transformed into an isostropic liquid, and is then gradually cooled to SmC* phase. Polarizers 41a, 41b are disposed on surfaces which are opposite to liquid crystal layer 46 of transparent substrates 42a, 42b respectively. As a result, the liquid crystal optical shutter array 3 making use of the SmC* phase liquid crystal having a ferrodielectric property is prepared.

The structure of the liquid crystal shutter array 4 is the same as that of the liquid crystal shutter array 3.

Figure 7:
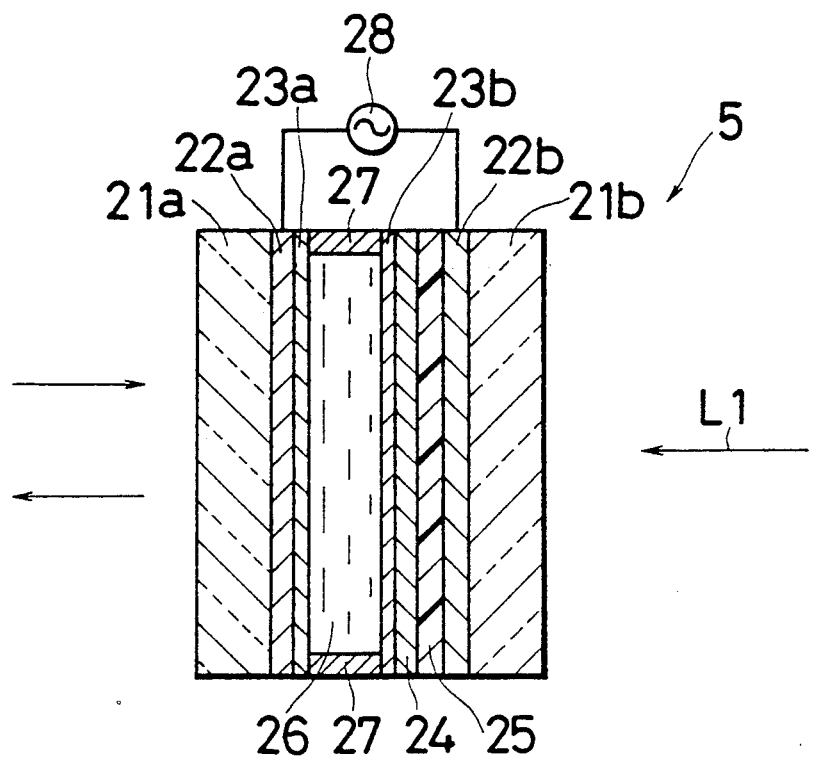
FIG. 7 is a sectional view of a liquid crystal light valve 5.

FIG. 7 is a sectional view of the liquid crystal light valve 5. Transparent conductive films of tin oxide (ITO) are formed on the glass substrates 21a, 21b as transparent electrodes 22a, 22b. A hydrogenated amorphous silicon (a-Si:H) is formed on the transparent electrode 22b as a photoconductor layer 25. The hydrogenated amorphous silicon was made of silane gas and hydrogen gas and was prepared by a plasma CVD method. A multilayer film of silicon/silicon oxide is formed thereon by a sputtering method as a dielectric mirror 24, which is a light reflection layer.

After forming polyimide films, by spin coating, as orientation films 23a, 23b, molecular orientation is treated by rubbing, and the glass substrates 21a, 21b are glued together by way of a spacer 27. As the liquid crystal layer 26, a mixed nematic liquid crystal containing chiral material is injected and sealed. Thus, the liquid crystal light valve 5 is prepared. As the operation mode of the liquid crystal light valve 5, the hybrid field effect is employed.

Between the transparent electrodes 22a, 22b of the liquid crystal light valve 5 in such a structure, a voltage is applied from the AC power source 28. When writing light L1 enters from the glass substrate 21b side, the impedance of the photoconductor layer 25 varies depending on the quantity of incident light. As a result, the voltage applied to the liquid crystal layer 26 is changed, the orientation state of the liquid crystal varies, and an image is formed in the liquid crystal layer 26. Therefore, the light entering from the glass substrate 22a side is reflected by the dielectric mirror 24, and only the light passing through the liquid crystal layer 26 changed in the orientation state changes in the polarization direction. Thus, it can pass through the polarization beam splitter 8 as stated above.

According to this embodiment, therefore, by using the liquid crystal shutter arrays 3, 4, the size of the liquid crystal display device 1 may be reduced. Further, by using the liquid crystal shutter arrays 3, 4 making use of the SmC* phase liquid crystal showing a ferrodielectric property, the response of the liquid crystal shutter arrays 3, 4 may be enhanced. Therefore, if the image to be written is a moving picture, a quantity of light necessary for displaying the image in the liquid crystal light valve 5 may be sufficiently given. Still further, since the liquid crystal shutter arrays 3, 4 are statically driven, control is easy. Therefore, the number of electrodes 43a, 43b may be increased, and the image of high resolution may be displayed in the liquid crystal light valve 5.

Meanwhile, as the liquid crystal of liquid crystal shutter arrays 3, 4, a mixed nematic liquid crystal with a double refractive index of nearly 0.13 may be also used. Furthermore, two-frequency driven LCD, pi-cell and other high speed responsive nematic LCD, may be used.

As the photoconductor layer 25 used in the liquid crystal light valve 5, cadmium sulfide (CdS), hydrogenated amorphous silicon (a-Si:H), hydrogenated silicon amorphous carbide (a-SiC:H), and others may be also used.

Incidentally, the photoconductor layer 25 may also be composed in a Schottky structure. In this case, when hydrogenated amorphous silicon is used in the photoconductor layer 25, instead of the transparent electrode 22b, a semitransparent electrode made of, for example, palladium (Pd), platinum (Pt) and molybdenum (Mo) is formed. The semitransparent electrode is formed in a thickness of about 50 Å by, for example, a vacuum deposition method. When a crystalline silicon is used in the photoconductor layer 25, gold (Au), palladium (Pd) or platinum (Pt) is used in the semitransparent electrode. When a crystalline gallium arsenic is used in the photoconductor layer 25, gold (Au) or platinum (Pt) is used in the semitransparent electrode.

As the operation mode of the liquid crystal light valve 5 and liquid crystal shutter arrays 3, 4, when using smectic liquid crystal, birefringence mode, guest-host mode or light scattering mode may be employed. Where nematic liquid crystal is used, the twisted nematic mode, electric field induced birefringence mode, dynamic scattering mode, or hybrid field effect mode may be employed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display device comprising:
   a light source for transmitting light;
   selective transmitting means for selectively transmitting light received from the light source by selectively driving certain of a plurality of electrodes, contained on each of a pair of first light penetrating substrates sandwiching a first liquid crystal layer, based upon an input image; and
   image holding means for holding the input image, including
   a second pair of light penetrating substrates,
   a second liquid crystal layer formed between the second pair of substrates,
   a pair of electrodes for applying voltage to the second liquid crystal layer,
   a light reflecting layer on the light source side of the second liquid crystal layer, and
   an impedance change layer, on the light source side of the second liquid crystal layer, for receiving the selectively transmitted light and for varying in impedance depending on the amount of selectively transmitted light received to thereby vary the voltage applied to the second liquid crystal layer to thus hold the input image within the second liquid crystal layer.

2. A liquid crystal display device according to claim 1, wherein the selective transmitting means comprises:
   a plurality of liquid crystal elements in series, each element including a plurality of band-shaped transparent electrodes, as the plurality of electrodes, formed on each mutually confronting surface of the first pair of light penetrating substrates, parallel at specified individually corresponding positions, with the first liquid crystal layer sandwiched between the substrates, and
   wherein each of the liquid crystal elements are disposed so that the plurality of band-shaped transparent electrodes of one element cross orthogonally to those of another.

3. A liquid crystal display device according to claim 1, wherein the image holding means holds the input image as an optical change of the second liquid crystal layer, by receiving light corresponding to the input image from the selective transmitting means, in a state of a voltage being applied to the electrodes.

4. A liquid crystal display device according to claim 1, further comprising:
   a second light source, for transmitting light for reading the held input image,
   a screen onto which the held image is projected and displayed, and
   optical means for receiving transmitted light from the second light source and for emitting the received light to the image holding means, which holds the input image as an optical change of the second liquid crystal layer, and for projecting towards the screen, reflected light received from the light reflecting layer of the image holding means and corresponding to the image held by the image holding means.

5. A liquid crystal display device according to claim 4, wherein the optical means comprises:
   polarization optical means for reflecting incident light of a predetermined polarized characteristic from received incident light, and for transmitting incident light of a second predetermined polarized characteristic from the received incident light, said polarization optical means being disposed on an optical path between the image holding means and the screen.

6. An imaging method comprising the steps of:
   a) transmitting light from a light source;
   b) selectively driving a plurality of electrodes, formed on a pair of transparent substrates which sandwich a first liquid crystal layer, to selectively pass the transmitted light, said selective driving being based upon an input image;
   c) receiving the selectively passed light of step b) in an image holding means for holding the image, the image holding means including a second liquid crystal layer, a pair of electrodes for applying voltage to the second liquid crystal layer, a light reflecting layer and an impedance changing layer; and
   d) varying impedance of the impedance changing layer based upon the amount of light received, thereby varying the voltage applied to the second liquid crystal layer, thus varying an orientation state of the second liquid crystal layer, to thereby hold the input image in the image holding means.

7. The method of claim 6 further comprising the steps of:
   e) transmitting a reading light from a second light source;
   f) receiving the transmitted reading light, through the second liquid crystal layer holding the input image, by the light reflecting layer; and
   g) reflecting the received light back through the second liquid crystal layer and thereby projecting the held input image.

* * * * *